United States Patent
Lee et al.

(10) Patent No.: US 9,535,644 B2
(45) Date of Patent: Jan. 3, 2017

(54) ELECTRONIC APPARATUS

(71) Applicant: Samsung Electronics Co., Ltd., Suwon-si, Gyeonggi-do (KR)

(72) Inventors: Seung-pok Lee, Suwon-si (KR); Chang-won Son, Yongin-si (KR); Dae-young Noh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 14/589,274

(22) Filed: Jan. 5, 2015

(65) Prior Publication Data

US 2015/0194084 A1 Jul. 9, 2015

(30) Foreign Application Priority Data

Jan. 3, 2014 (KR) ........................ 10-2014-0000935

(51) Int. Cl.
*G09G 3/14* (2006.01)
*G09G 3/18* (2006.01)
*G06F 3/14* (2006.01)

(52) U.S. Cl.
CPC ........... *G06F 3/14* (2013.01); *G09G 2330/021* (2013.01); *G09G 2370/16* (2013.01); *G09G 2370/22* (2013.01)

(58) Field of Classification Search
None
See application file for complete search history.

(56) References Cited

U.S. PATENT DOCUMENTS

| 2009/0037633 | A1* | 2/2009 | Solomon | G06F 1/1632 710/303 |
| 2009/0138110 | A1* | 5/2009 | Kohyama | H04R 29/008 700/94 |
| 2014/0344605 | A1* | 11/2014 | Xie | G06F 1/3293 713/324 |

* cited by examiner

*Primary Examiner* — Joseph Haley
*Assistant Examiner* — Emily Frank
(74) *Attorney, Agent, or Firm* — Jefferson IP Law, LLP

(57) ABSTRACT

An electronic apparatus is provided. The electronic apparatus includes a speaker configured to output sound, a communication interface configured to receive sound data from an external device, a sound processor configured to process the received sound data and to output the processed sound data to the speaker, a display configured to display a state of a connection with the external device, and a microcomputer controller configured to control the display to display the state of the connection with the external device when the electronic apparatus is in a non-booted state.

19 Claims, 12 Drawing Sheets

FIG. 11

| Mode | OSD Message |
|---|---|
| Power On | BT SPK READY |
| Pairing | BT SPK PAIRING |
| Pairing Fail | BT SPK PAIRING FAIL |
| Pairing Pass / Connected | BT SPK CONNECTED |
| Disconneced | BT SPK DISCONNECTED |
| Power Off | BT SPK OFF |

ELECTRONIC APPARATUS

CROSS-REFERENCE TO RELATED APPLICATION(S)

This application claims the benefit under 35 U.S.C. §119(a) of a Korean patent application filed on Jan. 3, 2014 in the Korean Intellectual Property Office and assigned Serial number 10-2014-0000935, the entire disclosure of which is hereby incorporated by reference.

TECHNICAL FIELD

The present disclosure relates to an electronic apparatus. More particularly, the present disclosure relates to an electronic apparatus capable of displaying a state of a connection with an external device on a display of the electronic apparatus.

BACKGROUND

With the recent development of computer technologies, all-in-one desktop type Personal Computers (PCs) that have display apparatuses just as notebook computers are being widely used.

These all-in-one PCs have high-performance speakers, and can provide Bluetooth communication. As a result users may appreciate sound data stored in an external device by transmitting the sound data stored in the external device to an all-in-one PC via Bluetooth communication.

Whether or not there is a Bluetooth connection with the external device is displayed using a display apparatus such as a Light Emitting Diode (LED). However, having an additional LED to display a state of the Bluetooth connection, in addition to a basic display apparatus such as a Liquid Crystal Display (LCD), is not advantageous in terms of design appearance, power consumption, and cost of material.

Furthermore, since information that can be displayed and/or communicated through the LED is limited, it is generally difficult for a user to intuitively acknowledge a state of the Bluetooth connection with the external device based only on the display of the LED.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus capable of displaying a state of a connection with a Bluetooth apparatus using a display of the electronic apparatus.

In accordance with an embodiment of the present disclosure, an electronic apparatus is provided. The electronic apparatus includes a speaker configured to output sound, a communication interface configured to receive sound data from an external device, a sound processor configured to process the received sound data and to output the processed sound data to the speaker, a display configured to display a state of a connection with the external device, and a microcomputer controller configured to control the display to display the state of the connection with the external device when the electronic apparatus is in a non-booted state.

In accordance with another aspect of the invention, the display is further configured to display an image according to a user control command when the electronic apparatus is in a booted state.

In accordance with another aspect of the invention, the display is at least one of a Liquid Crystal Display (LCD) and an Active Matrix Organic Light-Emitting Diode (AMOLED).

In accordance with another aspect of the invention, the microcomputer controller is further configured to control the display to display the image corresponding to the user control command, to display the state of the connection with the external device on one area of the image, when the electronic apparatus is in the booted state, and to display only the state of the connection with the external device, when the electronic apparatus is in the non-booted state.

In accordance with another aspect of the invention, the image corresponding to the user control command is a result of driving one of an operating system and an application program installed in the operating system.

In accordance with another aspect of the invention, the microcomputer controller is further configured to perform the control to supply power to the display and to display, on the display, the state of the connection with the external device, when the electronic apparatus is in the non-booted state and receives a request to display the state of the connection with the external device.

In accordance with another aspect of the invention, the microcomputer controller is further configured to perform the control to display, on the display, the state of the connection with the external device, and, in response to a predetermined time passing, to perform the control to shut off the power supplied to the display.

In accordance with another aspect of the invention, the microcomputer controller is further configured to perform the control to supply power to the communication interface, when the electronic apparatus is in the non-booted state and receives a command to connect the external device.

In accordance with another aspect of the invention, the microcomputer controller is further configured to perform the control to supply power to the sound processor and the speaker, when the electronic apparatus is in the non-booted state and is connected to the external device.

In accordance with another aspect of the invention, the microcomputer controller is further configured to perform the control to not supply power to the communication interface, the sound processor, and the speaker, when the electronic apparatus is in the non-booted state and is connected to the external device and when the electronic apparatus receives a command to shut off the connection with the external device.

In accordance with another aspect of the invention, the communication interface includes a Bluetooth communicator configured to receive the sound data using Bluetooth communication.

In accordance with another aspect of the invention, the Bluetooth communicator is further configured to provide the received sound data to the sound processor using digital communication.

In accordance with another aspect of the invention, the sound processor includes an audio codec unit configured to perform decoding of the transmitted sound data and to output the decoded sound data to the speaker.

In accordance with another aspect of the invention, the apparatus may further include a storage configured to store sound source data, and a Platform Controller Hub (PCH) configured to transmit the stored sound source data to the sound processor, wherein the sound processor comprises a switch unit configured to selectively transmit sound data output from one of the communication interface and the PCH to the speaker.

In accordance with another aspect of the invention, the apparatus may further include an inputter including a button configured to receive an input of a command to change the state of the connection with the external device.

In accordance with another aspect of the invention, the button may illuminate light corresponding to the state of the connection.

In accordance with another aspect of the invention, in response to the electronic apparatus being in the non-booted state and a command being received through the button, the microcomputer controller is further configured to control an operation state of the communication interface, the sound processor, and the speaker.

In accordance with another aspect of the invention, the display includes a Read Only Memory (ROM) configured to store a plurality of images corresponding to the state of the connection, and to display the image stored in the ROM.

In accordance with another aspect of the invention, the state of the connection may be at least one of power on, pairing, pairing fail, connected, and power off.

In accordance with another aspect of the invention, the electronic apparatus may be one of an all-in-one Personal Computer (PC) and a notebook.

In accordance with another embodiment of the present disclosure a method of an apparatus is provided. The method includes receiving, by a communication interface, sound data from an external device, processing, by a sound processor, the received sound data, outputting, by the sound processor, the processed sound data to a speaker, displaying, by a display, a state of a connection with the external device, and controlling, by a microcomputer controller, the display to display the state of the connection with the external device when the electronic apparatus is in a non-booted state.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11 is a view of examples of a state of a connection with an external device according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions or constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 through 12, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Figure 1:
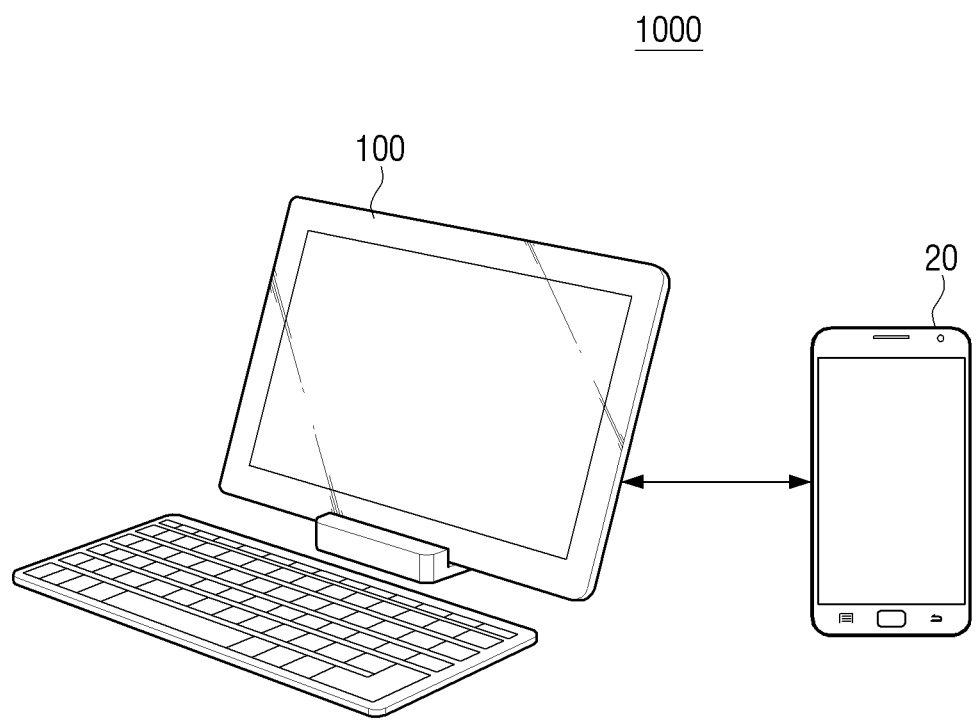
FIG. 1 is a view of an electronic system including an electronic apparatus according to an embodiment of the present disclosure.

FIG. 1 is a view of an electronic system including an electronic apparatus according to an embodiment of the present disclosure.

Referring to FIG. 1, an electronic system 1000 according to an embodiment of the present disclosure consists of an electronic apparatus 100 and an external device 20.

The electronic apparatus 100 receives a drive command from a user, and performs an operation according to the received drive command. Furthermore, the electronic apparatus 100 may receive sound data from the external device 20 using Bluetooth communication, and may output the received sound data using a speaker installed therein. The electronic apparatus 100 may be a Personal Computer (PC), notebook, Portable Media Player (PMP), MP3 player, and cradle that operates by booting of an operating system. Herein, the PC may be an all-in-one PC that includes a display apparatus, and the cradle may be of a configuration connected to the notebook or the PMP and thus capable of expanding functions of the notebook or the PMP. Operations and configurations of the electronic apparatus 100 will be explained in detail hereinafter with reference to FIG. 2.

The external device 20 stores sound source data, and transmits sound data of the stored sound source data to the electronic apparatus 100 using Bluetooth communication. The external device 20 may be a PC, notebook, mobile phone, smart phone, PMP, or MP3 player that provides the Bluetooth communication.

In explaining FIG. 1, an assumption is made that the electronic apparatus 100 and the external device 20 are connected through the Bluetooth communication, but the electronic apparatus 100 and the external device may be connected using other wireless communication technologies.

Figure 2:
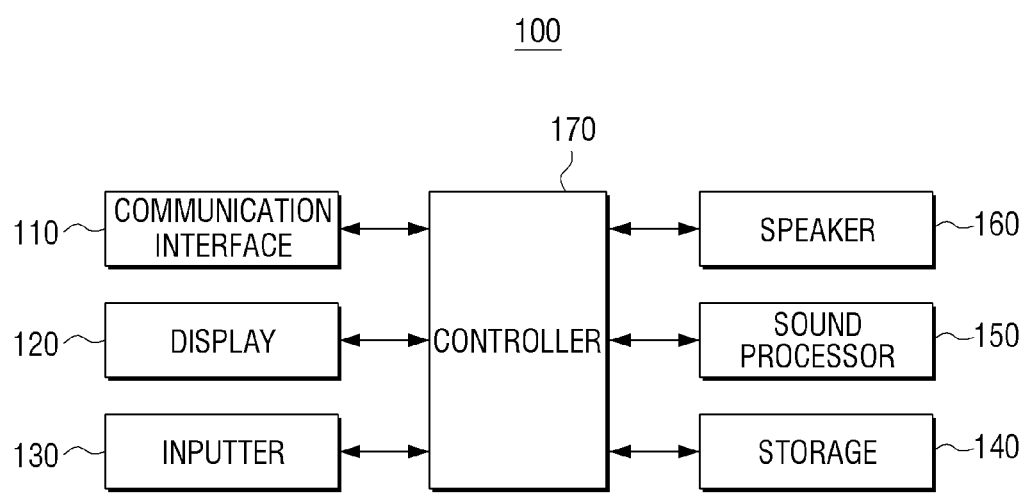
FIG. 2 is a block diagram for explaining a configuration of an electronic apparatus of FIG. 1 according to an embodiment of the present disclosure.

FIG. 2 is a block diagram for explaining a configuration of an electronic apparatus of FIG. 1 according to an embodiment of the present disclosure.

Referring to FIG. 2, an electronic apparatus 100 according to an embodiment of the present disclosure consists of a communication interface 110, a display 120, an inputter 130, a storage 140, a sound processor 150, a speaker 160, and a controller 170.

The electronic apparatus 100 has a plurality of operation states. The plurality of operation states may be classified into a booted state where the electronic apparatus 100 operates using an operating system, and a non-booted state where the operating system is loaded.

Herein, the booted state is a state where an operating system stored in a nonvolatile memory is loaded on a volatile memory and an operation of the electronic apparatus 100 is controlled, whereas the non-booted state may be a state where an operation of the electronic apparatus 100 is not controlled by the operating system, a power off state, a power saving state, or a non-booted output state and the like. Herein, the power off state is where external power source is not applied to the electronic apparatus 100, the power saving state is where only a minimum configuration receive power for receiving a control command of a user, and the non-booted output state is where only a configuration for receiving sound data from an external device and outputting the sound data to a speaker receive power.

The communication interface 110 may be configured to connect the electronic apparatus 100 to an external device 20 (see FIG. 1), in the format of not only a Local Area Network (LAN) and the internet, but also wireless communication (for example, wireless communication such as Global System for Mobile Communications (GSM), Universal Mobile Telecommunications System (UMTS), Long Term Evolution (LTE), and Wireless Broadband (WiBRO)).

Furthermore, the communication interface 110 receives sound data from the external device. Specifically, the communication interface 110 may include a Bluetooth communicator, and may receive sound data from the external device. When realized, the communication interface 110 may be realized as one Bluetooth communicator, or a plurality of Bluetooth communicators. For example, the electronic apparatus 100 may have a first Bluetooth communicator that operates only at a booted state and a second Bluetooth communicator that operates at a non-booted state as well. Further, an operation by the communication interface 110 of receiving sound data from the external device 20 may also be performed when the electronic apparatus 100 is at a non-booted state.

Furthermore, the communication interface 110 transmits sound source data to the external device 20. For example, when the connected external device 20 is a Bluetooth speaker, the communication interface 110 may transmit sound source data stored in the storage 140, which is explained hereinafter. When the interface 110 has a plurality of Bluetooth communicators, the communication interface 110 may transmit sound source data to a second external device while receiving sound data from a first external device.

In an embodiment of the present disclosure, an assumption is made that the data stored in the electronic apparatus 100 is sound source data, and the data being transmitted to/received from the external device 20 is sound data, but this is just for convenience of explanation, and thus the sound source data and sound data may be the same.

The display 120 may be used to select various functions that the electronic apparatus 100 supports, and may display various information provided in the electronic apparatus 100. Specifically, when the electronic apparatus 100 is at a booted state, the display 120 may display an image by a result of driving the operating system and an application program installed in the operating system. Herein, the display 120 may display a state of a connection with the external device 20 together with the aforementioned image according to a user control command. The display 120 may be realized as a Cathode Ray Tube (CRT), a Plasma Display Panel (PDP), a Liquid Crystal Display (LCD), or an Active Matrix Organic Light Emitting Diode (AMOLED) capable of displaying an image according to a user control command.

Further, even when the electronic apparatus 100 is at a non-booted state, the display 120 may display the state of the connection with the external device 20. Examples of user interface windows that may be displayed on the display 120 will be explained hereinafter with reference to FIGS. 7 to 10.

The inputter 130 receives a user control command. The inputter 130 may be realized as a keyboard, mouse, or touch screen integrated with the aforementioned display 120.

The inputter 130 may be used to select sound source data stored in the storage 140, as explained hereinafter. In addition, the inputter 130 may be used to select the external device 20 to which it is connected. Specifically, when the display 120 displays a list of external devices that may be connected using Bluetooth communication, one of those external devices may be selected as the external device 20.

Furthermore, the inputter 130 includes a button for receiving an input of a command to change the state of the connection or a command to display the state of the connection. Herein, the command to change the state of the connection is a command to change a state of an operation of the Bluetooth communicator and speaker. It may include a command to turn on the Bluetooth communicator, a pairing command to connect the external device 20 and the Bluetooth, and a command to turn off the Bluetooth communicator. This button may illuminate information corresponding to the state of the connection with the external device with light. For example, when the external device 20 is not connected, the button may not illuminate light, but during a pairing process, the button my flicker light, and when the external device is connected, the button may continue illuminating light.

The storage 140 stores a program for driving the electronic apparatus 100. Specifically, the storage 140 may store a program that is a set of various command words necessary when driving the electronic apparatus 100. Herein, the program may include not only an application program for providing a specific service but also an operating system for driving the application program.

Furthermore, the storage 140 stores sound source data. Herein, the sound source data may be a sound source file such as MP3, way, or data in a streaming format.

Furthermore, the storage 140 may be realized as a storage medium inside the electrode apparatus 100, or as an external storage medium such as a removable disk including Universal Serial Bus (USB) memory, or a web server through a network etc.

The sound processor 150 processes the received sound data and outputs the processed sound data to the speaker 160. Specifically, the sound processor 150 outputs the sound data received through the communication interface 110 to the speaker. The processing of the sound data by the sound processor 150 may be performed even when the electronic apparatus 100 is at a non-booted state.

Furthermore, the sound processor 150 may process the sound source data stored in the storage 140 and output the processed sound source data to the speaker 160. Configurations and operations of the sound processor 150 will be explained in detail hereinafter with reference to FIG. 3.

The speaker 160 outputs the sound data provided from the sound processor 150. In an embodiment of the present disclosure, an assumption is made that the provided sound data is output from the speaker only, but it may be realized such that the sound data is output from an earphone or speaker separable from the electronic apparatus 100 through a sound output terminal.

The controller 170 controls each configurative element inside the electronic apparatus 100. Specifically, when a booting command is input by a user, the controller 170 may perform booting using an operating system stored in the storage 140. Furthermore, upon receiving the sound data from the external device 20, the controller 170 may control the communication interface 110 and sound processor 150 such that the sound data transmitted from the external device 20 may be output to the speaker 160.

Furthermore, upon receiving a command displaying the state of the connection with the external device 20 through the inputter 130, the controller 170 may control the display 120 to display the state of the connection with the external device 20. Furthermore, when the state of the connection with the external device 20 is changed, the controller 170 may control the display 120 to display the changed state of the connection.

As aforementioned, the electronic apparatus 100 according to an embodiment of the present disclosure may output the sound data transmitted from outside to the speaker 160 even when the electronic apparatus 100 is not booted, thereby reducing the inconvenience of having to connect an additional audio or boot the Personal Computer (PC) in order to reproduce a music file stored in the external device such as a smart phone.

Furthermore, the electronic apparatus 100 according to an embodiment of the present disclosure displays the state of the connection with the external device using an LCD that is basically provided in the electronic apparatus 100, thereby reducing the manufacturing cost. Furthermore, the electronic apparatus 100 according to an embodiment of the present disclosure may display the state of the connection with the external device 20 in further detail using a relatively large LCD, thereby enabling the user to acknowledge the state of the connection with the external device more precisely.

In FIG. 1, an assumption is made that the electronic apparatus 100 includes the configuration of a controller and storage, but when the electronic apparatus 100 is realized as a cradle the aforementioned controller and storage may be a notebook or PMP connected to the cradle.

Furthermore, in FIG. 1, an assumption is made that the display 120 and the inputter 130 of the electronic apparatus 100 are separate, but it may be realized to have a touch screen where inputting and outputting functions operate in one apparatus.

Figure 3:
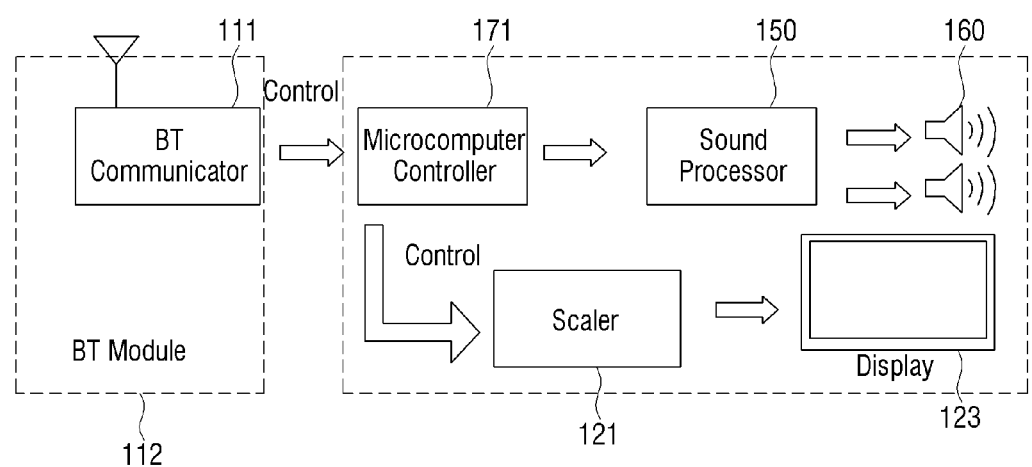
FIG. 3 is a view for explaining a method for displaying a state of a connection with an external device according to an embodiment of the present disclosure.

FIG. 3 is a view for explaining a method for displaying a state of a connection with an external device according to an embodiment of the present disclosure.

Referring to FIG. 3, an electronic apparatus includes a Bluetooth module 112 including a Bluetooth (BT) communicator 111, a sound processor 150, a speaker 160, a scaler 121, a display 123 and microcomputer controller 171.

The Bluetooth communicator 111 may search for an external device, and perform a connection with an authorized external device.

Furthermore, the Bluetooth communicator 111 may receive sound data from the external device.

Herein, the Bluetooth communicator 111 may provide the received sound data to the sound processor 150 in a digital method. In an embodiment of the present disclosure, an assumption is made that the received sound data is directly provided to the sound processor 150 in a digital method, but it may be realized that the communicator 111 outputs the sound data in an analog method, and transmits the received sound data to the sound processor 150 via another configurative element such as the microcomputer controller 171.

Furthermore, the Bluetooth communicator 111 transmits a state of a connection with the external device to the microcomputer controller 171. The Bluetooth communicator 111 operates even when the electronic apparatus is at a non-booted state.

The sound processor 150 performs decoding of the sound data provided from the Bluetooth communicator 111, and outputs the decoded sound data to the speaker 160.

The scaler 121 controls the display 123 to display the state of the connection with the external apparatus according to a control of the microcomputer controller 171. Operations of the scaler 121 will be explained hereinafter in detail with reference to FIG. 4.

The microcomputer controller 171 performs the control such that power suitable to the operation state of the electronic apparatus may be supplied to each configurative element. Specifically, when the electronic apparatus is at a power saving state, the microcomputer controller 171 may perform the control such that power is supplied to only some configurative elements of the electronic apparatus (for example, only to the inputter 130 and the microcomputer controller 171).

Furthermore, when the electronic apparatus is in a non-booted-output state, the microcomputer controller 171 may perform the control such that power is supplied only to the configurative elements for the sound data to be output from the external device to the speaker (for example, only to the Bluetooth communicator 111, the microcomputer controller 171, the sound processor 150, and the speaker 160).

Furthermore, when the electronic apparatus is in a power saving state and it is necessary to display the state of the connection (when a command to display the state of the connection with the external device is input by the user or when the state of the connection with the external device is changed), the microcomputer controller 171 may perform the control such that power is supplied only to configurative elements for displaying the state of the connection (for example, the Bluetooth communicator 111, the microcomputer controller 171, the scaler 121, and the display 123 (herein, power is not supplied to a Central Processing Unit (CPU) and storage)).

When the electronic apparatus is in a non-booted-output state and when it is necessary to display the state of the connection (when a command to display the state of the connection with the external device is input by the user or when the state of the connection with the external device is changed), the microcomputer controller 171 may perform the control such that power is supplied to only configurative elements for the sound data provided from the external device to be output to the speaker and the configurative elements for displaying the state of the connection (for example, the Bluetooth communicator 111, the microcomputer controller 171, the sound processor 150, the speaker 160, the scaler 121, and the display 123 (herein, power is not supplied to the CPU or storage)).

When it is necessary to display the state of the connection, the microcomputer controller 171 controls the scaler 121 and the display 123 to display the state of the connection. Specifically, upon receiving a request to display the state of the connection from the user or receiving an input that the state of the connection with the external device changed from the Bluetooth communicator 111, the microcomputer controller 171 receives the current state of the connection from the Bluetooth communicator 111, and provides information on the current state of the connection to the scaler 121, such that an image corresponding to the received state of the connection may be displayed. Accordingly, the scaler 121 may load the image corresponding to the state of the connection provided to a Read Only Memory (ROM) and display it on the display 123. The change of the state of the connection with the external device may include a case where the electronic apparatus is automatically connected with the external device having a pairing history, and a case where the connection with the external device is shut off.

Upon receiving the sound data from the Bluetooth communicator 111, the microcomputer controller 171 may control the sound processor 150 to output the received sound data.

Figure 4:
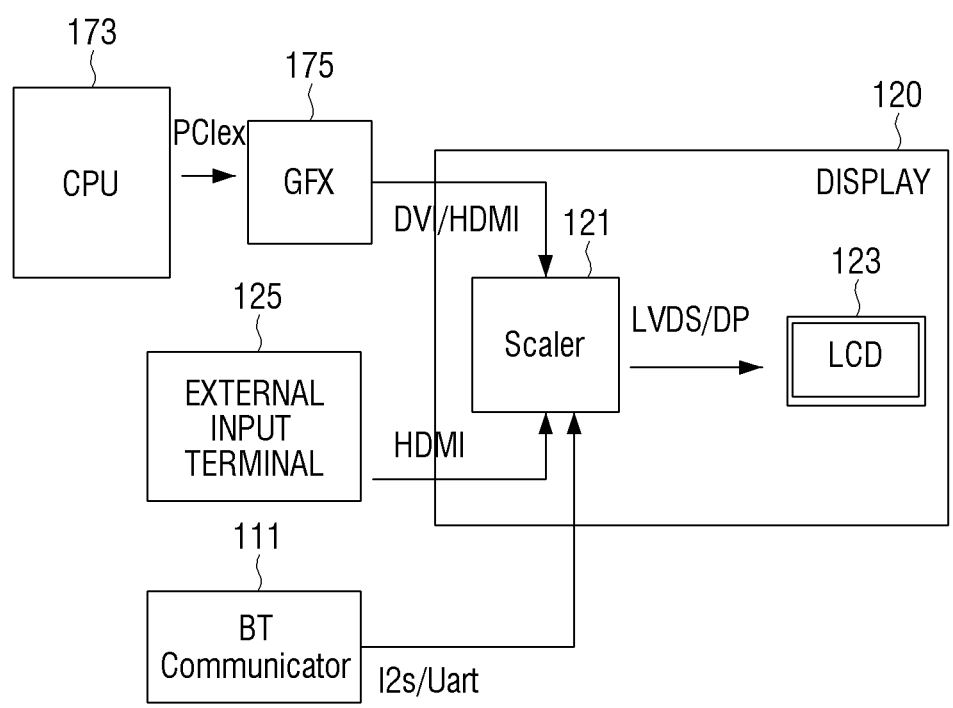
FIG. 4 is a view for explaining an operation of a display of FIG. 2 according to an embodiment of the present disclosure.

FIG. 4 is a view for explaining an operation of a display of FIG. 2 according to an embodiment of the present disclosure.

Referring to FIG. 4, a display 120 consists of a scaler 121 and a display 123.

The display 123 displays an image provided from the scaler 121. The display 123 may be a CRT, a PDP, an LCD, or an AMOLED.

The scaler 121 may receive an image from various configurative elements, and output one of the received images to the display 123 or mix the plurality of images provided and output the mixed image to the display 123. Specifically, the scaler 121 receives an image generated in a graphic processor (GFX) 175, an image generated in an external device through an external input terminal 125, and an image according to a state of a connection with a Bluetooth communicator 111 (specifically, an image stored in a ROM), and displays one of the received images on the display 123. Herein, the image generated in the graphic processor 175 may be an image by a result of an arithmetic operation of a CPU 173.

Furthermore, as illustrated in FIG. 4, the scaler 121 may display the image stored in the ROM (specifically, an image displaying the state of the connection with the external device) on one area of the image generated in the graphic processor 175 or the image generated in the external device together. When the electronic apparatus is in a non-booted state, the scaler 121 may display only the image stored in the ROM on the display 123. Herein, the scaler 121 may display the image stored in the ROM to fill the display 123, or on only one area of the screen of the display 123.

The CPU 173 may communicate with the graphic processor 175 using a Peripheral Component Interconnect Express (PCIex) standard, the graphic processor 175 may communicate with the scaler 121 using Digital Video (DV) or a High-Definition Multimedia Interface (HDMI), the external input terminal 125 may also communicate with the scaler 121 using a HDMI, the Bluetooth communicator 111 may communicate to the scaler 121 using Interface to Stream (I2s) or a Universal Asynchronous Receiver/Transmitter (UART), and the scaler 121 may communicate to the display 123 using Low-Voltage Differential Scaling (LVDS) or Display Picture (DP).

Figure 5:
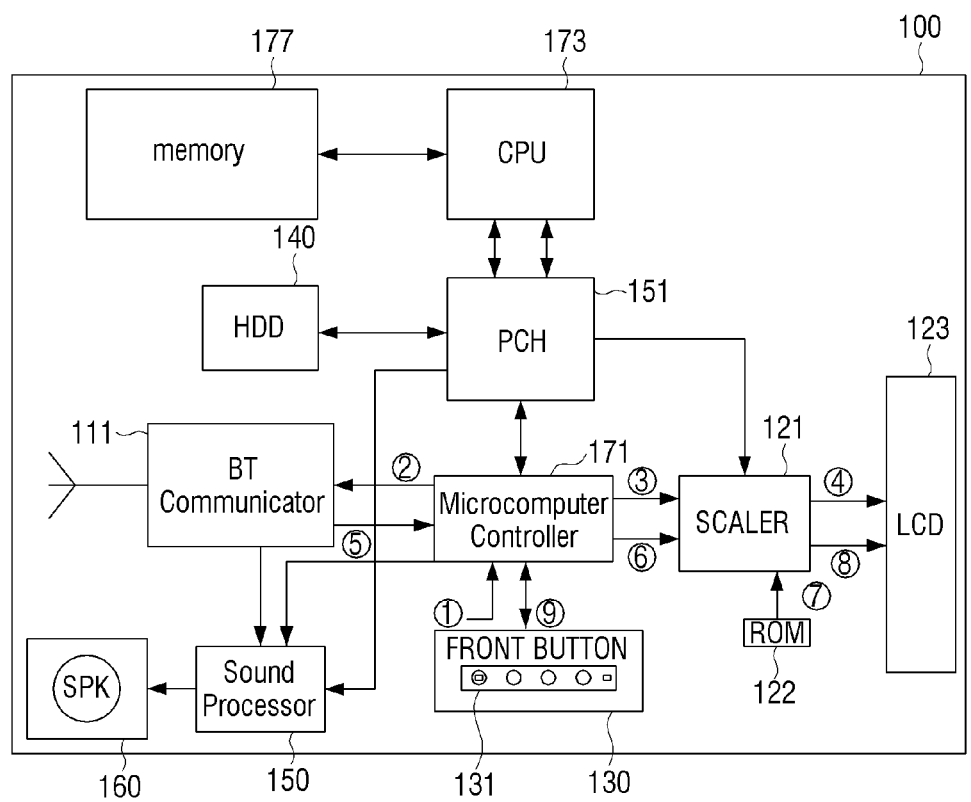
FIG. 5 is a view for explaining an operation of each configurative element of an electronic apparatus at a non-booted state according to an embodiment of the present disclosure.

FIG. 5 is a view for explaining operations of each configurative element of an electronic apparatus at a non-booted state according to an embodiment of the present disclosure.

Referring to FIG. 5, an electronic apparatus 100 is at a non-booted state. At the non-booted state, power is not supplied to configurative elements other than a microcomputer controller 171 and an inputter 130 of the configurative elements in the electronic apparatus 100.

At the non-booted state, the user may input a command to display a state of a connection with an external device, and a command requesting a connection with the external device through the inputter 130.

When a command displaying the state of the connection with the external device or requesting connection with the external device is input through a front button 131 of the inputter 130, the inputter 130 notifies the microcomputer controller 171 that the command is input (①).

In order to acknowledge the state of the connection, the microcomputer controller 171 requests a Bluetooth communicator 111 for the state of the connection (②, ⑤). With power not being supplied to the Bluetooth communicator 111, the microcomputer controller 171 may acknowledge that the external device is not connected without any additional request. That is, the microcomputer controller 171 may acknowledge the state of the connection based on the state of power supply of the Bluetooth communicator 111.

When the electronic apparatus 100 is at a non-booted state, the microcomputer controller 171 may have power supplied to a scaler 121, a ROM 122, and a display 123 (e.g., an LCD display) during the process of acknowledging the state of the connection with the external device (③, ④), and provide the information on the state of the connection to the scaler 121 to display the acknowledged state of the connection (⑤, ⑥). It may be realized such that power may be supplied to the scaler 121, the ROM 122 and the display 123 after the state of the connection is acknowledged.

Accordingly, the scaler 121 may load an image corresponding to the state of the connection from the ROM 122 (⑦), and display the loaded image on the display 123 (⑧).

In order to save power, when a predetermined time passes after the displaying operation, the microcomputer controller 171 may control the scaler 121 and the display 123 to stop the display operation, and when there is no additional control command from the user for a predetermined time after the display operation stopped, the microcomputer controller 171 may control such that power is not supplied to the scaler 121, the ROM 122, and the display 123.

When an external device is connected and sound data is transmitted from the connected external device at a non-booted state, the Bluetooth communicator 111 transmits information that the sound data is transmitted to the microcomputer controller 171. Upon receiving such information, the microcomputer controller 171 may perform a control such that power is supplied to a sound processor 150 and a speaker (SPK) 160 to output sound, and control the sound processor 150 to which power is supplied to output the sound data received from the Bluetooth communicator 111.

Accordingly, the sound processor 150 may receive the sound data from the Bluetooth communicator 111, perform decoding of the received sound data, and output the decoded sound data to the speaker 160.

When the transmission of sound data from the external device is interrupted, or the external device is disconnected, the microcomputer controller 171 may perform the control such that power is not supplied to the sound processor 150 and speaker 160.

Furthermore, the electronic apparatus 100 may include a Platform Controller Hub (PCH) 151 capable of communicating with a CPU 173, a memory 177 and a storage 140, such as a Hard-Disk Drive (HDD).

Figure 6:
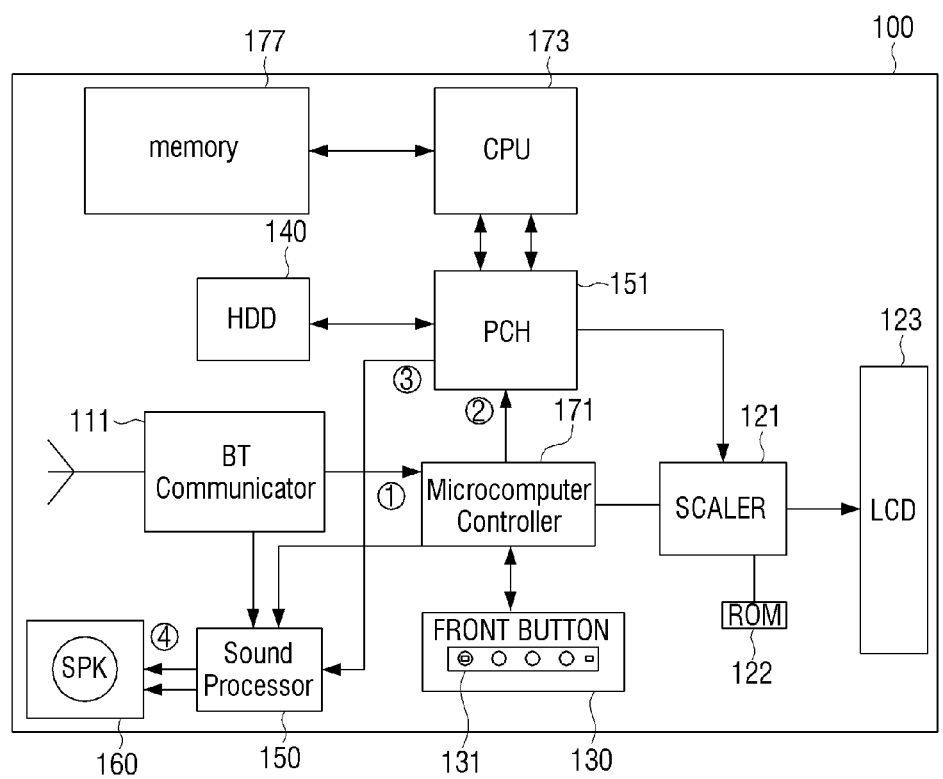
FIG. 6 is a view for explaining an operation of each configurative element of an electronic apparatus at a booted state according to an embodiment of the present disclosure.

FIG. 6 is a view for explaining an operation of each configurative element of an electronic apparatus at a booted state according to an embodiment of the present disclosure.

Referring to FIG. 6, an electronic apparatus 100 is at a booted state. At the booted state, power is supplied to all configurative elements in the electronic apparatus.

At the booted state, upon receiving a command to display a state of a connection with an external device from a user through a front button 131 of an inputter 130, a microcomputer controller 171 requests a Bluetooth communicator 111 for the state of the connection to acknowledge the state of the connection, receives the state of the connection, and then provides information on the received state of the connection to a scaler 121. Accordingly, the scaler 121 may load an image corresponding to the state of the connection from a ROM 122, and display the loaded image on a display 123 (e.g., an LCD display).

When connected with the external device and sound data is transmitted from the external device, the Bluetooth communicator 111 notifies the microcomputer controller 171 that sound needs to be output (①). Upon receiving such information, microcomputer controller 171 may control a sound processor 150 to receive sound data from the Bluetooth communicator 111 and output the sound data. When the sound source data stored in a storage 140, such as a HDD, is being provided to the sound processor 150 through a PCH 151 before the sound data is received from the Bluetooth communicator 111, the microcomputer controller 171 may have the PCH 151 stop transmitting the sound source data (②). Accordingly, the PCH 151 may stop transmitting the sound source data stored in the storage 140 (③).

The sound processor 150 may receive the sound data from the Bluetooth communicator 111, perform decoding of the received sound data, and output the decoded sound data to a speaker (SPK) 160 (④). The decoding may be performed through an audio codec unit provided in the sound processor 150. Herein, the audio codec unit is a configurative element for decoding sound source in a digital method.

The sound processor 150 includes a switch unit configured to selectively transmit the sound data being output from the PCH 151 or Bluetooth communicator 111. That is, the sound processor 150 may receive the sound source data stored in the storage 140 through the PCH 151, and receive the sound data from the external device through the Bluetooth communicator 111. Therefore, the sound processor 150 may select the sound to be output to the speaker using the switch unit.

Furthermore, the PCH 151 may be capable of communicating with a CPU 173 and a memory 177 of the electronic apparatus 100.

FIGS. 7, 8, 9 and 10 are examples of user interface windows that may be displayed on an electronic apparatus of FIG. 1 according to various embodiments of the present disclosure.

Figure 7:
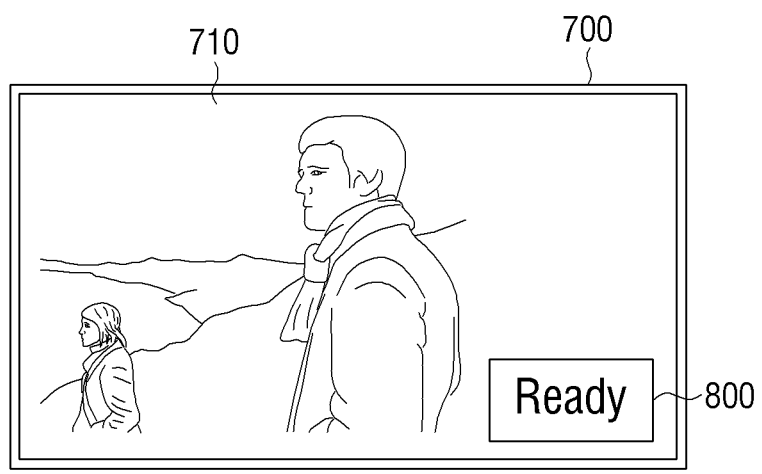
FIG. 7 is an example of a user interface window that may be displayed on an electronic apparatus of FIG. 1 according to an embodiment of the present disclosure.

Referring to FIG. 7, a user interface window 700 includes a first area 710 that displays an image and a second area 800 that displays a state of a connection.

The first area 710 is an area for displaying an image corresponding to a user control command with the electronic apparatus booted (specifically, an image corresponding to a result of driving an operating system or an application program installed in the operating system).

The second area 800 is an area for displaying the state of the connection with an external device. It is disposed at one side of the first area 710. The state of the connection may include not only "Ready" 800 of FIG. 7, "Ready" 810 of FIG. 8, "Paring" 820 of FIG. 9, and "Connected" 830 of FIG. 10, but also power on, pairing failure, and power off, as illustrated in FIG. 11.

Figure 8:
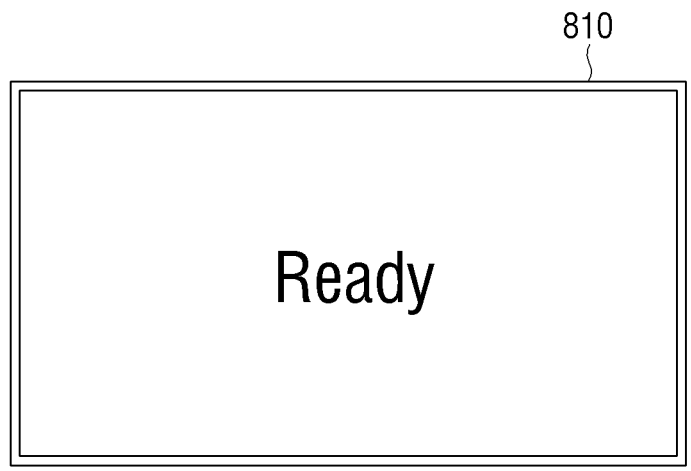
FIG. 8 is an example of a user interface window that may be displayed on an electronic apparatus of FIG. 1 according to an embodiment of the present disclosure.
Figure 9:
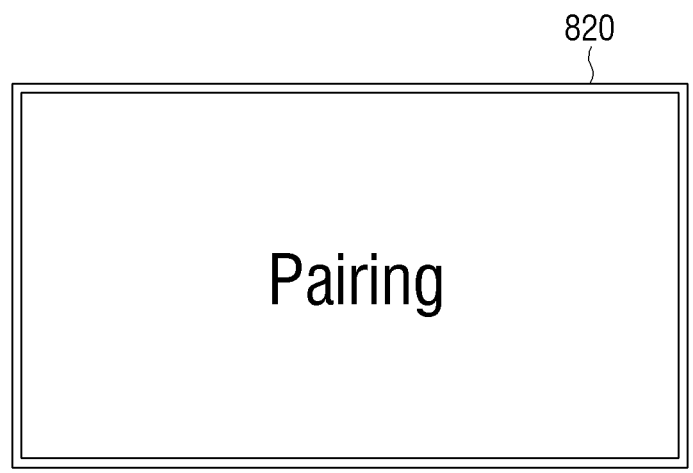
FIG. 9 is an example of a user interface window that may be displayed on an electronic apparatus of FIG. 1 according to an embodiment of the present disclosure.
Figure 10:
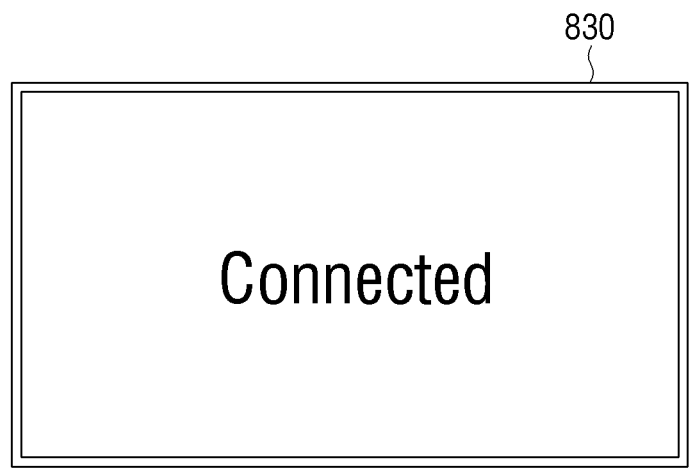
FIG. 10 is an example of a user interface window that may be displayed on an electronic apparatus of FIG. 1 according to an embodiment of the present disclosure.

Referring to FIG. 8, in the illustrated example, the second area 800 is disposed at a right/below side of the first area 710, but there is no limitation thereto the position and size of the second area 800.

FIG. 11 is a view of examples of a state of a connection with an external device according to an embodiment of the present disclosure.

Referring to FIG. 11, a table is illustrated, wherein a state of a connection with an external device is identified as Mode and wherein a corresponding message is identified as an On Screen Display (OSD) message. For example for the mode "Power On," the OSD message is "BT SPK READY," for the mode "Pairing," the OSD message is "BT SPK PAIRING," for the mode "Pairing Fail," the OSD message is "BT SPK PAIRING FAIL," for the mode "Paring Pass/Connected," the OSD message is "BT SPK CONNECTED," for the mode "Disconnected," the OSD message is "BT SPK DISCONNECTED," and for the mode "Power Off," the OSD message is "BT SPK OFF."

Figure 12:
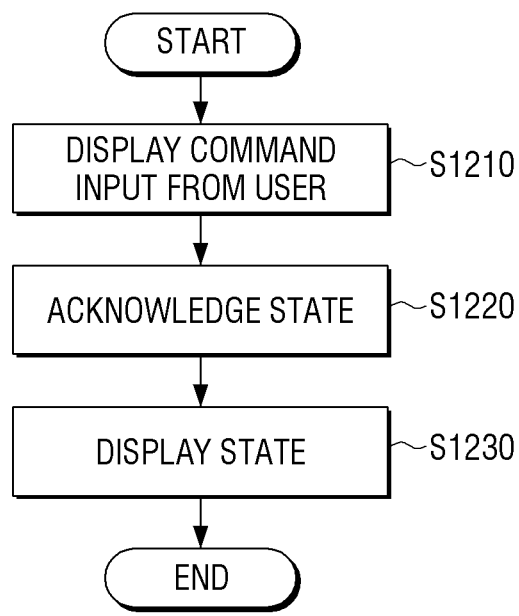
FIG. 12 is a flowchart for explaining a method for displaying a state of a connection according to an embodiment of the present disclosure.

FIG. 12 is a flowchart for explaining a method for displaying a state of a connection according to an embodiment of the present disclosure.

Referring to FIG. 12, first of all, a command to display a state of a connection with an external device is input from a user in operation S1210. Specifically, a command to display the state of the connection with an external device may be input through a button disposed at one side of an electronic apparatus.

In response to the user display command, the state of the connection with the external device is acknowledged in operation S1220. Herein, when the electronic apparatus is at a non-booted state, a microcomputer controller may perform a control such that power is supplied to necessary configurative elements, and also acknowledge the state of the connection with the external device through a Bluetooth communicator.

The acknowledged state of the connection is displayed in operation S1230. Specifically, when the electronic apparatus is at a booted state, the acknowledged state of the connection may be displayed on the display. When the electronic apparatus is at a non-booted state, power may be supplied to the display, and the display supplied with power may display the acknowledged state of the connection. Further, the aforementioned is based on an assumption that the state of the connection is displayed in response to the user's display command, but it may also be realized that the state of the connection is displayed when a predetermined event (for example, a connection with a prepared external device or a shut off from a preconnected external device) occurs.

The aforementioned method for displaying the state of the connection according to an embodiment of the present disclosure is capable of displaying the state of the connection with the external device even without using an additional LED device. Furthermore, since it displays the state of the connection with an external device using a display apparatus such as an LCD, various information may be provided to the user. The method for displaying the state of the connection as illustrated in FIG. 12 may be executed on an electronic apparatus having the configuration of FIG. 2, or on other electronic apparatuses of different configurations.

Furthermore, the aforementioned method for displaying the state of the connection may be realized as a program (or application) including an algorithm executable in a computer, and the program may be stored in a non-transitory computer readable medium and be provided.

A non-transitory readable medium refers to a computer readable medium that stores data semi-permanently rather than storing data for a short period of time such as a register, cache, and memory etc. More specifically, it may be a Compact Disc (CD), Digital Video Disc (DVD), hard disc, Blu-ray disc, USB, memory card, and ROM and the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
    a speaker configured to output sound;
    a communication interface configured to receive sound data from an external device;
    a sound processor configured to process the received sound data and to output the processed sound data to the speaker;
    a display; and
    a controller configured to control the display to display a state of a connection with the external device when the electronic apparatus is in a non-booted state,
    wherein the controller supplies power to at least one of the communication interface, the sound processor, the display, and the speaker when the electronic apparatus is in the non-booted state, and
    wherein the state of the connection comprises at least one of power on, pairing, pairing fail, connected, and power off.

2. The apparatus according to claim 1,
    wherein the display is further configured to display an image according to a user control command when the electronic apparatus is in a booted state.

3. The apparatus according to claim 2,
    wherein the display is at least one of a Liquid Crystal Display (LCD) and an Active Matrix Organic Light-Emitting Diode (AMOLED).

4. The apparatus according to claim 1,
    wherein the communication interface comprises a Bluetooth communicator configured to receive the sound data using Bluetooth communication.

5. The apparatus according to claim 4,
    wherein the Bluetooth communicator is further configured to provide the received sound data to the sound processor using digital communication.

6. The apparatus according to claim 1,
    wherein the display comprises a Read Only Memory (ROM) configured to store a plurality of images corresponding to the state of the connection, and to display the image stored in the ROM.

7. The apparatus according to claim 1,
    wherein the electronic apparatus is one of an all-in-one Personal Computer (PC) and a notebook.

8. An electronic apparatus comprising:
    a speaker configured to output sound;
    a communication interface configured to receive sound data from an external device;
    a sound processor configured to process the received sound data and to output the processed sound data to the speaker;
    a display; and
    a controller configured to control the display to display a state of a connection with the external device when the electronic apparatus is in a non-booted state,
    wherein the controller is further configured to control the display to display the image corresponding to the user control command, to display the state of the connection with the external device on one area of the image, when the electronic apparatus is in the booted state, and to display only the state of the connection with the external device, when the electronic apparatus is in the non-booted state.

9. The apparatus according to claim 8,
    wherein the image corresponding to the user control command is a result of driving one of an operating system and an application program installed in the operating system.

10. An electronic apparatus comprising:
    a speaker configured to output sound;
    a communication interface configured to receive sound data from an external device;
    a sound processor configured to process the received sound data and to output the processed sound data to the speaker;
    a display; and
    a controller configured to control the display to display a state of a connection with the external device when the electronic apparatus is in a non-booted state,
    wherein the controller is further configured to perform the control to supply power to the display and to display, on the display, the state of the connection with the external device, when the electronic apparatus is in the non-booted state and receives a request to display the state of the connection with the external device.

11. The apparatus according to claim 10,
wherein the controller is further configured to perform the control to display, on the display, the state of the connection with the external device, and, in response to a predetermined time passing, to perform the control to shut off the power supplied to the display.

12. An electronic apparatus comprising:
a speaker configured to output sound;
a communication interface configured to receive sound data from an external device;
a sound processor configured to process the received sound data and to output the processed sound data to the speaker;
a display; and
a controller configured to control the display to display a state of a connection with the external device when the electronic apparatus is in a non-booted state,
wherein the controller is further configured to perform the control to supply power to the communication interface, when the electronic apparatus is in the non-booted state and receives a command to connect the external device.

13. The apparatus according to claim 12,
wherein the controller is further configured to perform the control to supply power to the sound processor and the speaker, when the electronic apparatus is in the non-booted state and is connected to the external device.

14. The apparatus according to claim 13,
wherein the controller is further configured to perform the control to not supply power to the communication interface, the sound processor, and the speaker, when the electronic apparatus is in the non-booted state and is connected to the external device and when the electronic apparatus receives a command to shut off the connection with the external device.

15. An electronic apparatus comprising:
a speaker configured to output sound;
a communication interface configured to receive sound data from an external device;
a sound processor configured to process the received sound data and to output the processed sound data to the speaker;
a display; and
a controller configured to control the display to display a state of a connection with the external device when the electronic apparatus is in a non-booted state,
wherein the sound processor comprises an audio codec unit configured to perform decoding of the transmitted sound data and to output the decoded sound data to the speaker.

16. An electronic apparatus comprising:
a speaker configured to output sound;
a communication interface configured to receive sound data from an external device;
a sound processor configured to process the received sound data and to output the processed sound data to the speaker;
a display;
a controller configured to control the display to display a state of a connection with the external device when the electronic apparatus is in a non-booted state;
a storage configured to store sound source data; and
a Platform Controller Hub (PCH) configured to transmit the stored sound source data to the sound processor,
wherein the sound processor comprises a switch unit configured to selectively transmit sound data output from one of the communication interface and the PCH to the speaker.

17. An electronic apparatus comprising:
a speaker configured to output sound;
a communication interface configured to receive sound data from an external device;
a sound processor configured to process the received sound data and to output the processed sound data to the speaker;
a display;
a controller configured to control the display to display a state of a connection with the external device when the electronic apparatus is in a non-booted state; and
an inputter including a button configured to receive an input of a command to change the state of the connection with the external device.

18. The apparatus according to claim 17,
wherein the button illuminates a light corresponding to the state of the connection.

19. The apparatus according to claim 17,
wherein, in response to the electronic apparatus being in the non-booted state and a command being received through the button, the controller is further configured to control an operation state of the communication interface, the sound processor and the speaker.

* * * * *